United States Patent [11] 3,583,758

| [72] | Inventor | John W. Radford<br>685 Keller Parkway, St. Paul, Minn. 55117 |
|---|---|---|
| [21] | Appl. No. | 797,105 |
| [22] | Filed | Feb. 6, 1969 |
| [45] | Patented | June 8, 1971 |

[54] CAR SEAT
8 Claims, 11 Drawing Figs.

[52] U.S. Cl. ................................................. 297/314
[51] Int. Cl. ................................................. A47c 1/02
[50] Field of Search ....................................... 297/314,
216; 248/371, 397; 296/65, 65 S

[56] References Cited
UNITED STATES PATENTS
2,770,286  11/1956  Weller ........................... 297/314

| 2,984,290 | 5/1961 | Miller ........................... | 297/314X |
| 3,021,107 | 2/1962 | Salo ............................. | 297/314X |
| 3,466,089 | 9/1969 | Stueckle ........................ | 297/314 |

FOREIGN PATENTS
939,715  3/1956  Germany ..................... 297/314

*Primary Examiner*—James T. McCall
*Attorney*—Walter N. Kirn, Jr.

ABSTRACT: A car seat which is mounted to provide for rotation thereof in response to turning of the car, the rotation being about an axis defined by the mounting means for the seat. The mounting means are designed and located such that the axis of rotation is a line extending from the region of the occupants head to his feet whereby both head and feet remain relatively stationary during turning and only the hips move with the seat.

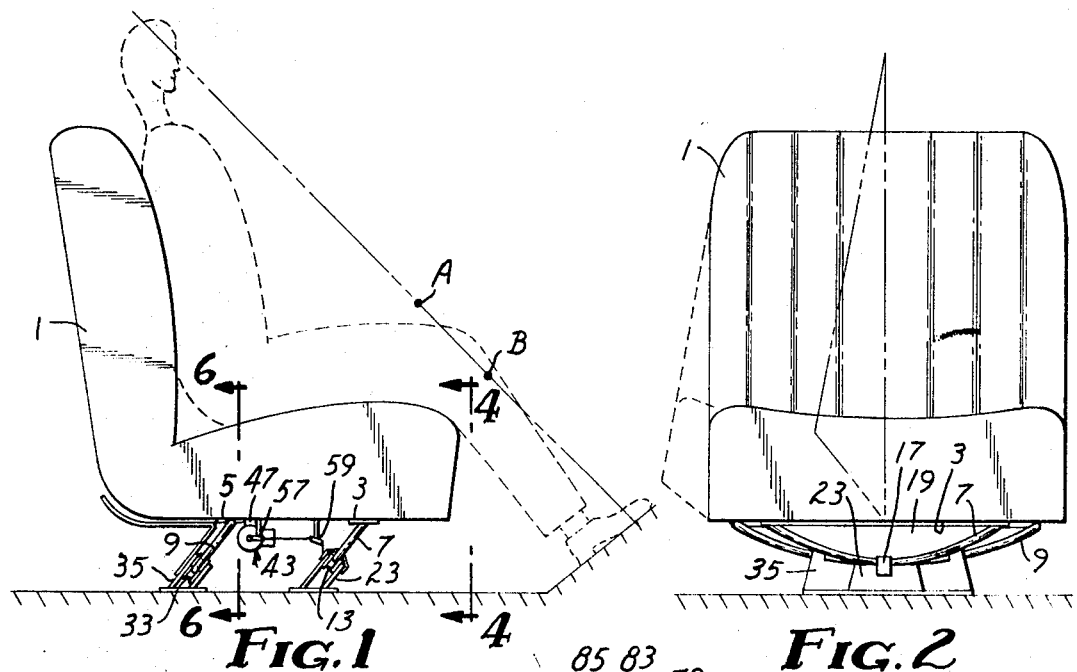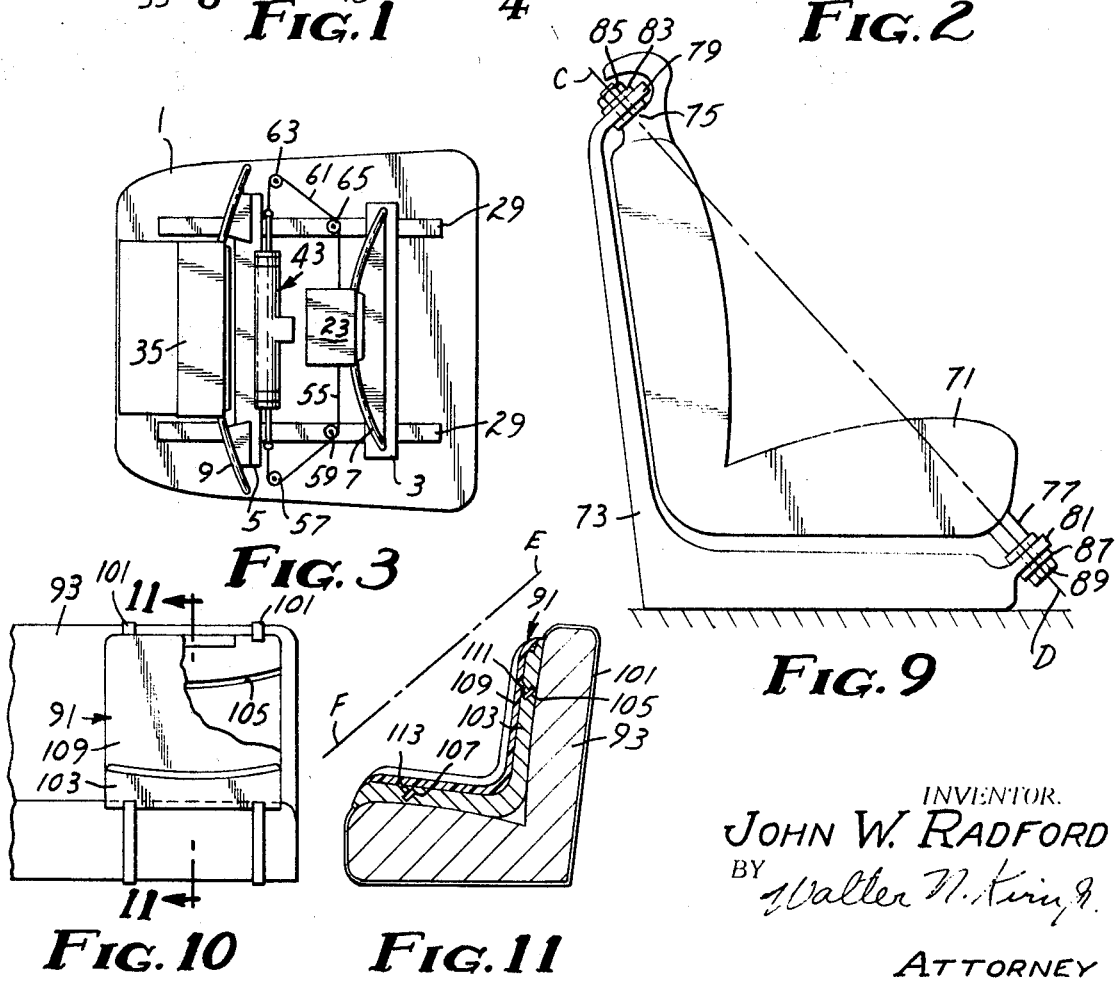

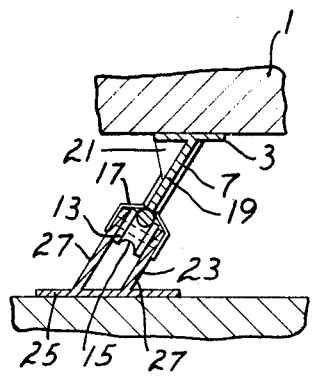
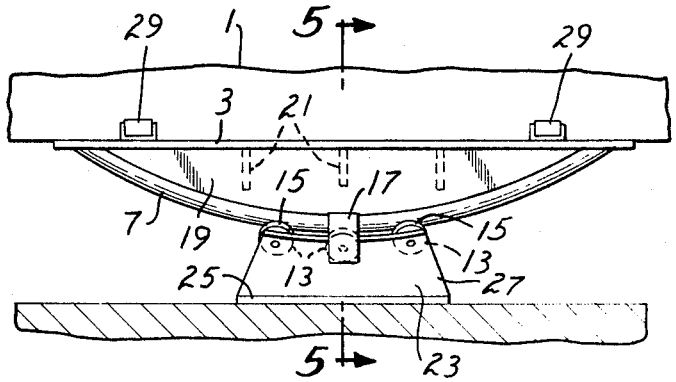
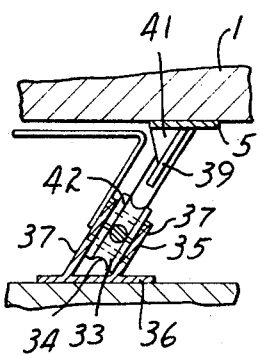
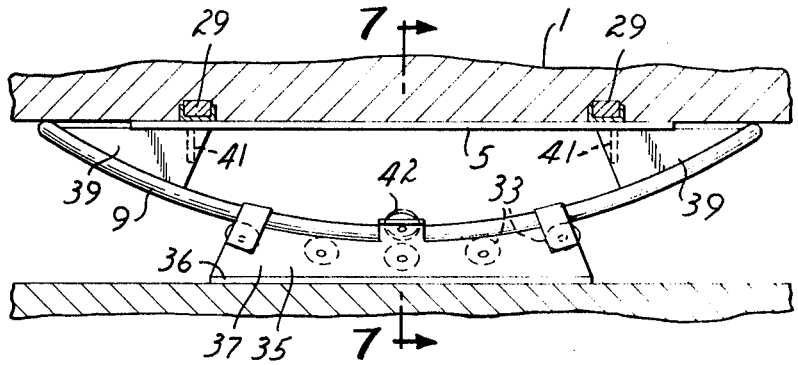
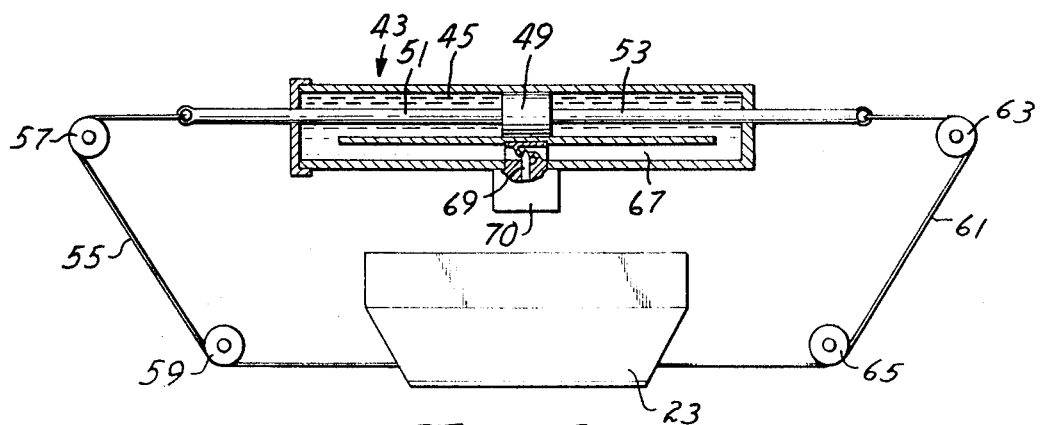
INVENTOR
JOHN W. RADFORD
BY Walter N. Kirn
ATTORNEY

CAR SEAT

This invention relates to a vehicular seat; more particularly it relates to a vehicular seat rotatable in response to a centrifugal force imposed upon the seat by a turning movement of the vehicle.

In recent years in particular the automotive industry has been engaged in an active campaign to provide safer automobiles. Many previously optional safety features have now become standard due in part to government imposed regulations. Safety belts and harnesses are exemplary of such new standard safety features. To date, however, the car seat itself, as opposed to seat accessories such as belts and the like, has not been the subject of any substantial safety oriented alterations. A major shortcoming of conventional car seats, whether of the bench or bucket type, are their inability to adjust to the centrifugal forces occasioned by out-of-line movement of the vehicle such as maneuvering of the vehicle on unbanked curves. As a result, the centrifugal force is imposed directly upon the occupant's body, tending to cause it to be moved out of or be distorted from the normal seating position. The occupant of course attempts to overcome this disruptive movement and reassume the normal position such as by leaning one way or the other, or possibly, in the case of the driver, by tightening the grip on the steering wheel. The results of this maneuvering can be discomfort to the occupant, impairment of road vision due to movement of the head, and loss of pedal control due to movement of the feet.

Even if the disruptive forces are overcome, there is at least momentary diversion of the driver's attention from operating the vehicle with consequent reduction in safety. In the case of violent turns, the driver may be unable to overcome such forces thereby losing control of the car.

It is thus a primary object of this invention to provide a mechanism adaptable to conventional seats which will enable the seat rather than the occupant to assume the disruptive forces encountered when the vehicle is turned.

A corollary objective is the provision of a mechanism adaptable to conventional seats whereby the occupant's body can be maintained in normal operating position during out-of-line movement of the vehicle or movement of the vehicle on slanted or unbanked roadway.

Another object is a car seat which will eliminate the discomfort occasioned by the occupants attempting to maintain his normal seating position against the disruptive forces imposed during out-of-line or level movement of the vehicle.

Another object is the provision of a car seat rotatable about an axis in response to centrifugal forces whereby the occupant's head and feet remain substantially stationary. Another object is the provision of rotatable mounting means for a car seat whereby an axis of rotation is defined which is above the occupant's center of gravity.

These and other objects which will be more apparent hereinafter are provided by the present invention which is a seat for motor vehicles and the like comprising a seat member, mounting means for said seat member defining an axis of rotation about which said seat member is rotatable in response to centrifugal forces, said axis of rotation being a downwardly declining line forward of the seat whereby rotation of said seat member provides for movement of the hip region of an occupant's body while maintaining the head and feet in a substantially stationary position. In the preferred embodiments, the seat further comprises a means associated with the seat member for controlling the rotatable movement thereof.

To promote a better understanding of the invention, reference is made to the accompanying drawings wherein:

FIG. 1 is a side elevation of one embodiment of the seat of this invention;

FIG. 2 is a front elevation of the embodiment of FIG. 1;

FIG. 3 is a top view of the embodiment of FIG. 1;

FIG. 4 is a sectional view taken along line 4-4 of FIG. 1;

FIG. 5 is a sectional view taken along line 5-5 of FIG. 4;

FIG. 6 is a sectional view taken along line 6-6 of FIG. 1;

FIG. 7 is a sectional view taken along line 7-7 of FIG. 6;

FIG. 8 is a top elevational view of a control mechanism for a seat of this invention;

FIG. 9 is a side elevational view of another embodiment of the invention;

FIG. 10 is a front elevational view, some parts broken away, of another embodiment of the invention especially adapted for conventional bench seats; and FIG. 11 is a sectional view taken along line 11-11 of FIG. 10.

Referring to FIGS. 1—8, a bucket seat 1 has front and rear mounting plates 3 and 5, respectively, to which are attached front and rear arcuate-shaped track-engaging members 7 and 9. The front track in which member 7 moves comprises a bank of rollers 13 having circumferential grooves 15 which define the track and hence the line of movement of the front track-engaging member 7. A retaining clip 17 cooperates with the center roller 13, the front track-engaging member 7 passing between the groove 15 and the top of the clip 17. A plate 19 spans the front track-engaging member 7 and mounting plate 3 and gives stability to the device. Fillets 21 strengthen the attachment of the plate 19 to mounting plate 3. The rollers 13 are mounted by conventional means in a front yoke member 23 having a baseplate 25 and sidepieces 27. Associated with seat 1 are conventional front and rear slides 29.

The rear track is similar in construction to the front track. A bank of rollers 33 having circumferential grooves 34 is mounted in rear yoke 35 having a baseplate 36 and sidepieces 37. Support plates 39 extend between rear track-engaging member 9 and rear mounting plate 5. Fillets 41 strengthen the attachment of the plates 39 to mounting plate 5. In addition, associated with the center roller of the bank of roll 33 is a roller 42 between which passes the rear track-engaging member 9. The roller 42 serves to keep the latter in the track and further acts as a stop when roller 42 engages either of plates 39.

The front and rear track-engaging members 7 and 9 are each arcs of a circle, the center points being designated by the letters A and B, respectively. The line A—B represents the axis of rotation for the seat 1. A suitable arrangement for an average man about 5 feet 10 inches tall is one wherein the front track-engaging member is an arc of a circle having a radius of 13.5 inches and the rear track-engaging member is an arc of a circle having a radius of 18.67 inches.

The rotation of the seat about the axis A—B is controlled by the hydraulic system 43 comprising a cylinder 45 being equipped with a piston 49 which is connected at opposing ends to piston rods 51 and 53. Attached to rod 51 is a cable 55 which passes around guides 57 and 59 to attachment to the front yoke member 23. To the end of rod 53 is attached a cable 61 which passes around guides 63 and 65 prior to connection to the front yoke member 23 opposite the attachment of cable 55 to yoke member 23. Cylinder 45 is equipped with a bypass 67 having a valve 69 through which hydraulic fluid passes from one side of piston 49 to the other. Valve 69 may be controlled by conventional means such as a solenoid 70.

The operation of the foregoing described embodiment of this invention will be described assuming the car in which the seat is mounted is in the midst of a right turn. Upon commencement of the right turn, the seat commences rotation to the left about the axis of rotation A—B, rotation being obtained by movement of front and rear track-engaging members 7 and 9 in the grooves 15 and 34 of rollers 13, 33, and 41. The turning angle speed with which the turn is accomplished, and the curvature of the road surface will determine the degree of rotation of the seat up to the maximum wherein roller 41 engages plate 39 or other stop means is engaged. It should be understood that while at least two tracks and two track-engaging members are preferred, one or more than two of each could be employed in the present invention.

The freedom of rotation can be adjusted to the driver's preference by means of the hydraulic cylinder. This adjustment is achieved by varying the setting of valve 69 in bypass 67. If the valve 69 is closed, the incompressible hydraulic fluid is trapped in the cylinder 45 thereby locking the piston 49. By opening the valve 69, fluid can be forced out of the side of the cylinder 45 in which it is contained through the valve to the other side of the cylinder allowing for movement of the piston and therefore the seat.

Referring to FIG. 9, a second embodiment of the invention is illustrated wherein a bucket seat 71 is rotatably mounted with respect to a stationary frame 73 by means of shafts 75 and 77 extending from the top and bottom of seat 71 as shown through bearing supports 79 and 81. Associated with upper shaft 75 is bearing 83 and retaining nut 85. Similarly, associated with lower shaft 77 is bearing 87 and retaining nut 89. The shafts 75 and 77 are axially aligned, the axis defining the axis of rotation C—D. While the combination of top and bottom shafts as illustrated is preferred, it is to be understood that only one such shaft is essential, the other shaft being eliminated and the remaining shaft providing both rotatability and attachment to the supporting structure.

FIGS. 10 and 11 illustrate still another embodiment wherein a seat 91 is mounted on a conventional bench seat 93 by means of straps 101. The seat 91 comprises a stationary frame 103 in the form of a stationary seat member having a pair of arcuate extending tracks 105 and 107 defining an axis of rotation E—F, and a rotatable seat member 109 rotatable about the E—F axis. The seat member 109 is equipped with track-engaging members 111 and 113 slidable in tracks 105 and 107, respectively. Preferably the tracks and track-engaging members are of the tongue and groove type so that the rotatable seat cannot move forward out of the tracks when the car is abruptly stopped. As shown, the tracks and track-engaging members are generally T-shaped in order to prevent such forward movement. The rotatable seat member 109 and the stationary frame 103 may be slightly biased by the expedient of having the track-engaging members slightly longer than the slot provided by the track or the slot and track-engaging members can be dimensioned such that the rotatable seat member makes sliding contact with the stationary frame. The contacting portions of the rotatable seat and stationary frame including track-engaging members and tracks should be of a relatively smooth and hard construction so as to minimize friction. Numerous commercially available rigid plastics may be employed.

The car seat of this invention may be installed in conventional automobiles without the need for redesigning of the interior. Installation at the time of construction or replacement of existing seats can be readily accomplished. Conventional seat belts and harnesses mounted to the seat may be employed.

If need be, to insure that the axis of rotation of the seat is above the occupant's center of gravity, added weight can be attached to the base of the seat. Many modifications of the present invention as herein described may be apparent to those of ordinary skill in the art without departing from the spirit and scope thereof. It is to be understood that while primary emphasis has been placed on a car seat in describing the present invention, the seat of this invention is adaptable to various modes of vehicular travel including airplanes, trains, tractors, snowmobiles, buses and the like.

What I claim is:

1. A seat for motor vehicles and the like comprising a seat member, mounting means for said seat member defining an axis of rotation about which said seat member is rotatable in response to centrifugal forces, said axis of rotation being a downwardly declining line forward of the seat whereby rotation of said seat member provides for movement of the hip region of an occupant's body while maintaining the head and feet in a substantially stationary position.

2. The seat of claim 1 wherein said mounting means comprises at least one track and at least one arcuately shaped track-engaging member mounted on said seat member.

3. The seat of claim 1 wherein said mounting means comprise at least one shaft member and at least one bearing member adapted to pivotably receive said shaft member.

4. A seat for motor vehicles and the like comprising a seat member, mounting means for said seat member comprising at least one track-engaging member mounted thereto and track means adapted to receive said track-engaging member, said mounting means defining an axis of rotation for said seat member which is a downward declining line forward of said seat member, said seat member being rotatable about said axis of rotation in response to centrifugal forces whereby an occupant's head and feet remain substantially stationary and his hips move with said seat member, and control means for controlling the rotatable movement of said seat member.

5. The seat of claim 4 wherein there are a pair of track means and a pair of track-engaging members.

6. The seat of claim 4 wherein said control means are hydraulic and adjustable.

7. A seat for motor vehicles and the like adaptable to bench seats for such motor vehicles, said seat comprising a stationary seat member having track means associated therewith, a rotatable seat member having track-engaging means associated therewith moveable engageable in said track means, said track means defining an axis of rotation for said rotatable seat member which is a downwardly declining line forward of said rotatable seat member whereby the head and feet of the occupant remain substantially stationary during rotatable movement of said seat member.

8. The seat of claim 1 wherein said axis of rotation is adapted to extend along a line from the occupant's head to his feet when in the seated position and further adapted to be located forward of the center of gravity of said occupant.